United States Patent
Mathewson, II et al.

(10) Patent No.: US 7,305,441 B2
(45) Date of Patent: Dec. 4, 2007

(54) TIME-SENSITIVE MESSAGES AND EVENTS

(75) Inventors: James M. Mathewson, II, Chapel Hill, NC (US); Keith A. Rafferty, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 09/909,537

(22) Filed: Jul. 20, 2001

(65) Prior Publication Data

US 2003/0018724 A1 Jan. 23, 2003

(51) Int. Cl.
*G06F 15/16* (2006.01)
*G06F 3/01* (2006.01)
*G06F 3/048* (2006.01)

(52) U.S. Cl. ..................... 709/206; 709/207
(58) Field of Classification Search ............... 709/200, 709/204, 206, 207; 345/752; 715/791, 802
See application file for complete search history.

(56) References Cited

U.S. PATENT DOCUMENTS

| | | | | |
|---|---|---|---|---|
| 5,325,310 A | * | 6/1994 | Johnson et al. | 709/206 |
| 5,493,692 A | * | 2/1996 | Theimer et al. | 455/26.1 |
| 5,537,618 A | * | 7/1996 | Boulton et al. | 715/745 |
| 5,675,733 A | * | 10/1997 | Williams | 709/206 |
| 5,960,337 A | * | 9/1999 | Brewster et al. | 455/404.2 |
| 6,014,688 A | * | 1/2000 | Venkatraman et al. | 709/206 |
| 6,049,698 A | * | 4/2000 | Capers et al. | 340/7.1 |
| 6,078,310 A | * | 6/2000 | Tognazzini | 345/158 |
| 6,108,688 A | * | 8/2000 | Nielsen | 709/206 |
| 6,175,859 B1 | * | 1/2001 | Mohler | 709/206 |
| 6,212,553 B1 | * | 4/2001 | Lee et al. | 709/206 |
| 6,256,516 B1 | * | 7/2001 | Wagner et al. | 455/565 |
| 6,317,487 B1 | * | 11/2001 | Cho | 379/88.25 |
| 6,463,463 B1 | * | 10/2002 | Godfrey et al. | 709/206 |
| 6,721,784 B1 | * | 4/2004 | Leonard et al. | 709/206 |
| 6,760,753 B1 | * | 7/2004 | Ohgushi et al. | 709/206 |
| 6,775,690 B1 | * | 8/2004 | Creswell et al. | 709/206 |
| 6,854,007 B1 | * | 2/2005 | Hammond | 709/206 |
| 2001/0010060 A1 | * | 7/2001 | Yu et al. | 709/245 |
| 2001/0014909 A1 | * | 8/2001 | Yoshida | 709/206 |
| 2001/0020247 A1 | * | 9/2001 | Ikeda et al. | 709/206 |
| 2002/0178224 A1 | * | 11/2002 | Kasajima | 709/206 |
| 2003/0014395 A1 | * | 1/2003 | Ruvolo et al. | 707/3 |

* cited by examiner

*Primary Examiner*—Glenton B. Burgess
*Assistant Examiner*—Philip J. Chea
(74) *Attorney, Agent, or Firm*—Marcia L. Doubet; Jeanine S. Ray-Yarletts

(57) ABSTRACT

Methods, systems, and computer program products for enabling message senders and event creators to convey time-sensitivity of their messages and events (such as electronic mail messages, electronic calendar entries, and "to-do" items), and for handling such messages and events at a receiver. A message sender marks messages as to whether they are time-sensitive, and may also identify a starting and ending time and/or date during which the time-sensitive status applies. When such a message arrives at a recipient, it is evaluated and if the time-sensitive period has been reached, the message is automatically displayed to the recipient. Preferably, the recipient must handle the displayed message before continuing on to other messages. The disclosed techniques enable messages to be viewed in a timely manner, according to the sender's representation of the time-sensitivity of the message. As a result of these improvements, communication between senders and receivers may become more effective.

18 Claims, 4 Drawing Sheets

TIME-SENSITIVE MESSAGES AND EVENTS

BACKGROUND OF THE INVENTION

1. Field of the Invention

The present invention relates to a computer system, and deals more particularly with methods, systems, and computer program products for enabling message senders and event creators to convey time-sensitivity of their messages and events (such as electronic mail messages, electronic calendar entries, and "to-do" items), and for handling such messages and events at a receiver.

2. Description of the Related Art

Electronic calendars and mail systems are quite popular among computer users, both in business settings and for personal use. Electronic calendars in many cases contain a wealth of information about their owner. For example, an individual may use an electronic calendar to maintain information about his work schedule, his meetings and other appointments, his vacation and business travel plans (including when he will be away, which flights or other transportation he will use, where he can be reached while away, who he may visit while away, etc.), phone calls that need to be made at particular times, and so forth. Examples of electronic calendaring systems include Microsoft Outlook® 2000 and Lotus Organizer®, which also allows a user to create entries on his calendar for other people. For example, a secretary might have calendar entries for his own schedule, but also keep information about his manager's appointments on his own "Lotus Organizer" is a registered trademark of Lotus Development Corporation.)

These types of systems may contain a number of other advantageous features. Lotus Organizer, for example, enables a user's calendar to be modified by other people, provided those people have been designated as authorized for this activity. Making this type of modification typically comprises sending a message or event to a calendaring system or application, which identifies the target user or users and the type of information to be entered, or "calendared", for the target user(s); the calendaring system then actually performs the modification on behalf of the message or event sender. (Hereinafter, the terms "message" and "event" are used synonymously, unless the context of usage indicates otherwise.) Use of electronic calendaring systems for purposes such as scheduling meetings of multiple persons is known in the art. For example, an invitation list may be created for a particular meeting, and a calendaring application may then use this list to check each invitee's calendar for available time periods. A meeting may then be scheduled during a time period in which all (or some majority) of the invitees have sufficient time available on their calendar.

The growing popularity of the public Internet has brought with it a huge increase in the number of people using electronic mail systems. Popular examples of electronic mail, or "e-mail", systems include Lotus Notes® and Eudora® from QUALCOMM Incorporated. ("Lotus Notes" is a registered trademark of Lotus Development Corporation. "Eudora" is a registered trademark of QUALCOMM Incorporated.)

In these prior art messaging systems, a message creator (referred to hereinafter equivalently as a message sender) has relatively little control over how the message receiver handles the received message, including when a particular message is opened or viewed, how messages are prioritized, whether messages which require some type of follow-up action are addressed, and so forth. For example, today's e-mail systems typically allow a message sender to mark an outbound message with an "urgent" flag. However, there is very little underlying support for handling such messages upon receipt. Typically, when a message marked as urgent is received, some type of visual cue is provided to distinguish this message from other messages which have not been similarly marked. Lotus Notes, for example, provides a separate "view"—that is, a separate pane in the graphical user interface ("GUI") window in which the user's incoming mail messages are displayed—for urgent messages. A heading of this view indicates that the user's urgent messages are displayed therein. If a user has no urgent messages in her mailbox, then this separate view is typically suppressed. Urgent messages received by a Eudora e-mail user are presented in-line within the user's incoming mail, along with normal mail messages, but are visually denoted by the presence of a red icon in a status column of the mailbox window. Eudora users may select from several different degrees of urgency when marking their outbound messages, and receiving systems which are adapted to processing these different degrees may then provide different corresponding icons. (Other receiving systems may only be adapted to handling urgency indicators as Boolean values.)

While the visual marking techniques of these prior art e-mail systems serve to visually distinguish urgent messages from non-urgent messages in the receiver's mailbox, the sender's control over the receiver's treatment of the message apparently stops there: no e-mail systems are known to the present inventors which allow the sender's actions to have other types of effects at the receiver (except for the return receipt feature which will be described). This prior art approach does nothing to ensure that the message receiver actually treats the message as urgent upon receipt. Instead, the user may—or may not—open the message with urgency. It is also up to the user whether to read the message, and whether to react—and whether to react with a sense of urgency. These prior art systems do not take into consideration that if an "urgent" message is not processed by the recipient in a timely manner, then the purpose of the e-mail message may be thwarted. For example, suppose an employee's manager sends her an urgent e-mail message at 9:00 a.m., calling a 10:00 a.m. meeting. Simply marking the outgoing message as urgent does nothing to ensure that the recipient will see it before the meeting starts (that is, within the timing that is important for this particular message). The user might be busy when the message arrives, or perhaps might have configured her e-mail system to check for new messages with relative infrequency, and therefore might not see the message in time. Or, the message might appear in the user's mailbox, but might be simply one of many similarly-flagged messages which the user may process at will. Suppose the user does not bother to read the message until 11:00 a.m. At that time, the message is unlikely to be urgent, and may in fact be completely unimportant (e.g. if the meeting has already ended).

Similarly, calendaring systems may enable someone scheduling a meeting or other event on a user's calendar to indicate that the meeting (or information about that meeting) is urgent. However, explicit action is required by the user before learning what the sense of urgency is all about. And, as discussed for prior art e-mail systems, if the user does not follow through on this action, then the sender's urgent information will not be communicated.

In some cases, a message or calendared event may convey some type of "to-do" item, where that to-do item requires the recipient to take some corresponding action. To-do items may appear in any message or event, whether marked urgent or not. For example, an e-mail message may notify the recipient that her manager needs a quarterly status report within three weeks. Because of the relatively long lead time, the message will probably not be marked as urgent. But regardless of how the message may be visually flagged in the receiver's mailbox, simply receiving the message into the mailbox does not ensure that the receiver will recognize the presence of the to-do item. And even if the to-do item is recognized, the message may subsequently become "lost" in the receiver's mail system as time passes, with the result that the receiver forgets about the item altogether.

For messages and events which require some type of follow-up, such as those containing to-do items, the sender and/or receiver must typically take action manually to track the status. Lotus Notes, for example, is configured to include a "Follow Up" folder. A message recipient may then manually move an incoming message requiring further action to that folder as a type of reminder that further attention is needed. Similarly, the sender may move his outbound copy of this same message to his own Follow Up folder to remind himself that he is awaiting some type of action or response by the recipient. Because this feature requires explicit manual actions, its effectiveness is limited.

Some e-mail and calendaring systems provide an automated "I am away" feature, whereby the e-mail or calendar user may configure her system to automatically respond to incoming messages and events with a message notifying the sender that the user is away and is therefore not receiving the sent message or event. This provides a type of limited feedback to the sender, notifying him that an urgent message will not likely be acted upon with urgency, for example. However, such "away" notification features are often misused, causing them to convey incorrect or out-of-date information. That is, the user may forget to change her settings or may simply choose not to change them. It may be difficult for some users to change their status once they have left their office as well, as they may no longer have access to the necessary systems. The more tedious it is for the user to change her configuration settings, the more likely it is that she will choose to let them become out of synchronization with her actual status. This leads to the undesirable situation where it appears to the sender that the user is available and checking her e-mail—and may therefore be expected to react quickly to urgent messages—when in fact she is not.

A number of e-mail systems also provide a "return receipt" feature, whereby a message sender may mark an outbound message with a flag to request notification from the receiver's e-mail system that the receiver has opened the mail message. While this technique conveys at least a limited amount of information to the sender, the sender still has no idea whether the receiver will act on the message. Furthermore, messages marked in this manner are typically not visually marked upon receipt in prior art systems: instead, the receiver is not informed that the message has been marked with return receipt until the message has been opened and the receiver is attempting to close it. Therefore, the receiver receives no information about the sender's requested treatment of the message until she happens to open it and prepares to close it.

U.S. Pat. No. 5,428,784, which is entitled "Method and Apparatus for Linking Electronic Mail and an Electronic Calendar to Provide a Dynamic Response to an Electronic Mail Message" discloses a technique for automatically responding to a received e-mail message using information stored in the addressee's electronic calendar. When an e-mail message is received, its receipt time is compared to the addressee's electronic calendar to see if any events are currently scheduled. If so, various types of information regarding the scheduled event (such as the start and stop time and what the event comprises) may be returned as a response to the e-mail sender so that the sender can determine whether the addressee is likely to be viewing his e-mail at the present time. If the user's calendar indicates that he is currently in a meeting or on vacation, for example, it is unlikely that the sender's mail will be read promptly. If the sender needs an immediate response to an urgent e-mail message, the sender can evaluate the automated response to decide whether to try some other source of information. However, as with manually configured "away" notifications, the response may be misleading if the calendar does not contain accurate information about the recipient's schedule.

Accordingly, improved techniques are needed which avoid the limitations of prior art systems.

SUMMARY OF THE INVENTION

An object of the present invention is to provide improved techniques for handling time-sensitive messages and events.

Another object of the present invention is to provide a technique which enables a message or event sender to have some control over how a recipient handles the incoming message or event.

It is a further object of the present invention to provide an automated follow-up mechanism for time-sensitive messages and events.

Yet another object of the present invention is to enable message and event senders to provide a timeframe with the message or event indicating when a response is needed from the receiver.

Still another object of the present invention is to enable message senders to have input into how message recipients prioritize the handling of their incoming mail.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, in a first aspect the present invention provides methods, systems, and computer program products for handling time-sensitive messages and events. This technique comprises: marking a message as time-sensitive; sending the marked message to a recipient; and automatically receiving a reply from the recipient regarding the marked message within a time period of the time-sensitivity of the marked message. The marking may optionally indicate whether snoozing is allowed by the recipient for this message. The marking may indicate an ending time for the time period of the time-sensitivity of the message, and may also indicate a starting time for the time period.

The technique may further comprise: receiving the marked message at a computing device of the recipient; determining whether the time period of the time-sensitivity of the received message has been reached; and requiring the received message to be rendered to the recipient if so. In this case, the recipient may be required to respond to the rendered message.

In another aspect, the present invention provides methods, systems, and computer program products for improving electronic communications. This technique comprises: receiving a plurality of electronic messages by a recipient to whom the electronic messages are addressed; and evaluating the received electronic messages for processing. The evaluation further comprises: determining whether a selected one of the received electronic messages is time-sensitive; and requiring the selected one to be rendered to the recipient if so. The evaluation may also comprise suppressing the required rendering unless a time period of the time-sensitivity has been reached.

The required rendering may be delayed until a later time if snoozing is allowed for the selected one, provided the later time is within the time period of the time-sensitivity.

The recipient may also be required to create a response to the rendered selected one, and this response may then be sent to a sender of the rendered selected one.

The technique may further comprise determining whether processing of the rendered selected one is complete, and if not, remembering the rendered selected one for subsequent evaluation at a later time, wherein the later time is within the time period of the time-sensitivity.

The electronic messages may be, for example, e-mail messages, electronic calendar events, or to-do items.

The present invention will now be described with reference to the following drawings, in which like reference numbers denote the same element throughout.

DESCRIPTION OF PREFERRED EMBODIMENTS

Figure 1:
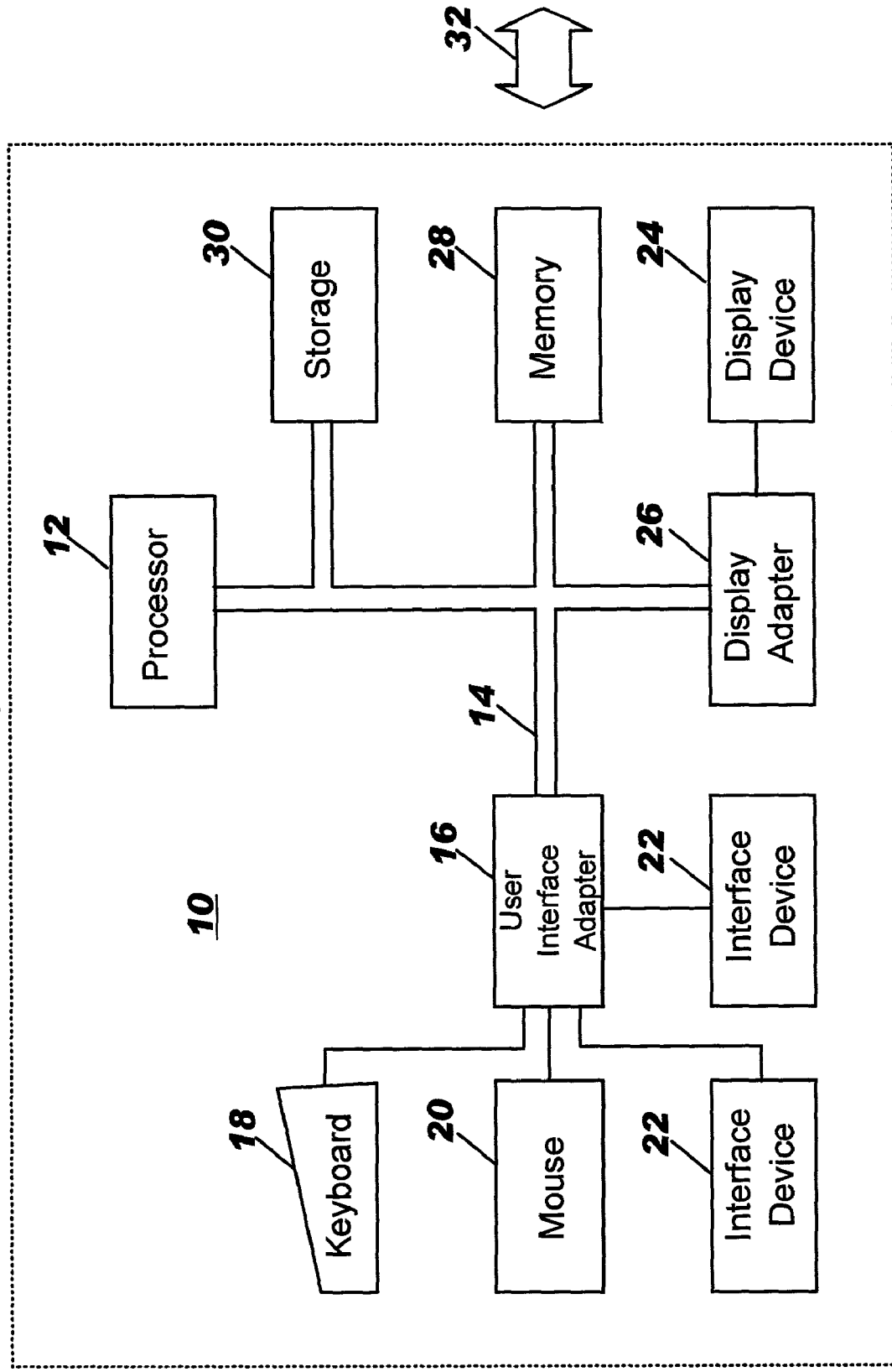
FIG. 1 is a block diagram of an exemplary end-user device in which the present invention may be practiced.

FIG. 1 illustrates a representative end-user device in which the present invention may be practiced. The device 10 of FIG. 1 may be any type of computer workstation or computing device, such as a personal computer, laptop computer, or handheld computer, including related peripheral devices. The device 10 includes a microprocessor 12 and a bus 14 employed to connect and enable communication between the microprocessor 12 and the components of the device 10 in accordance with known techniques. The device 10 typically includes a user interface adapter 16, which connects the microprocessor 12 via the bus 14 to one or more interface devices, such as a keyboard 18, mouse 20, and/or other interface devices 22, which can be any user interface device (such as a touch sensitive screen, digitized entry pad, etc.). The bus 14 also typically connects a display device 24, such as a liquid crystal display ("LCD") screen or monitor, to the microprocessor 12 via a display adapter 26. The bus 14 also connects the microprocessor 12 to memory 28 and, optionally, to long-term storage 30 which can include a hard drive, diskette drive, tape drive, etc.

The device 10 may communicate with other devices or networks of devices, for example via a communications channel or modem 32. Alternatively, the device 10 may communicate using a wireless interface at 32, such as a CDPD (cellular digital packet data) card. The device 10 may be associated with such other devices in a local area network (LAN) or a wide area network (WAN), or the device 10 can be a client in a client/server arrangement with another computer, etc. All of these configurations, as well as the appropriate communications hardware and software, are known in the art.

Figure 2:
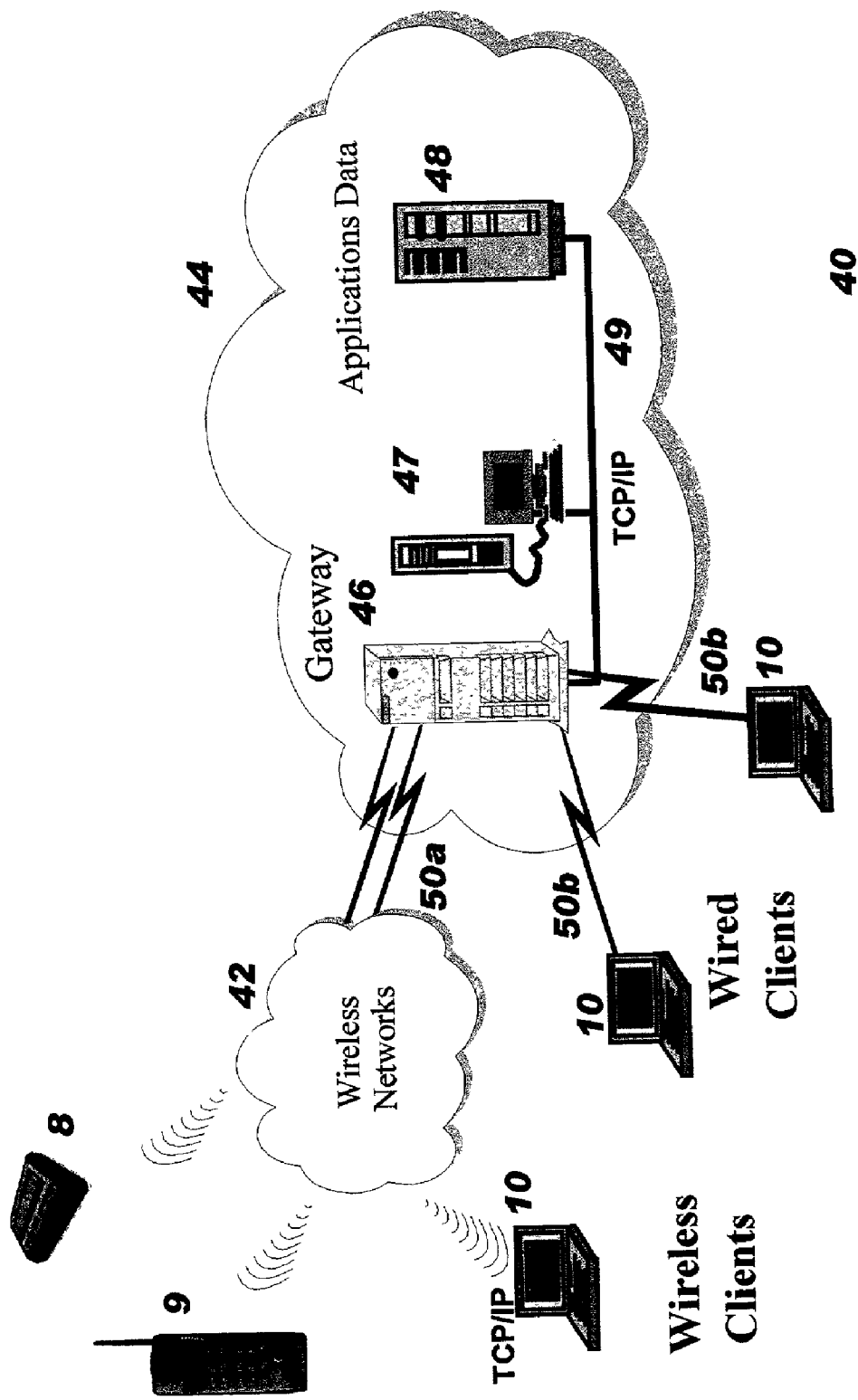
FIG. 2 is a diagram of an exemplary networked computing environment in which the present invention may be practiced.

FIG. 2 illustrates a representative data processing network 40 in which the present invention may be practiced. The data processing network 40 may include a plurality of individual networks, such as wireless network 42 and network 44, each of which may include a plurality of individual devices 10 (shown as portable computers) and other devices such as pagers 8 and cellular phones 9. Additionally, as those skilled in the art will appreciate, one or more LANs may be included (not shown), where a LAN may comprise a plurality of intelligent workstations and other devices coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more devices 10 using a communications link 50b. The gateway computer 46 may be implemented utilizing an Enterprise Systems Architecture/370 computer available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more devices 10 and other devices such as those shown at elements 8 and 9.

Those skilled in the art will appreciate that the gateway computer 46 may be located a great geographic distance from the network 42, and similarly, the devices 10 and other devices 8, 9, may be located a substantial distance from the networks 42 and 44. For example, the network 42 may be located in California, while the gateway 46 may be located in Texas, and one or more of the devices 10 may be located in New York. The devices 10 and other devices such as those shown at elements 8 and 9 may connect to the wireless network 42 using a networking protocol such as the Transmission Control Protocol/Internet Protocol ("TCP/IP"), a particular wireless networking protocol (such as the Wireless Application Protocol, or "WAP", the Global System for Mobile communications, or "GSM", etc.), or the Systems Network Architecture ("SNA") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The devices 10 may alternatively connect directly to the gateway 46 using dial connections 50b. Further, the wireless network 42 and network 44 may connect to one or more other networks (not shown), in an analogous manner to that depicted in FIG. 2.

Software programming code which embodies the present invention may be accessed by the microprocessor 12 of the device 10, other device such as those shown at 8 and 9, and/or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computing device to a server using a wired connection, or a wireless connection. Wired connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computing device may be any type of computer processor, including laptop, handheld or mobile computers; vehicle-mounted devices; desktop computers; mainframe computers; etc., having processing and communication capabilities The remote server, similarly, can be one of any number of different types of computer which have processing and communication capabilities. These techniques are well known in the art, and the hardware devices and software which enable their use are readily available.

In the preferred embodiments, the present invention is implemented as computer software. The program code of the preferred embodiments may be implemented, for example, as objects in an object-oriented programming language, or in a conventional procedurally-oriented language, or in a mix of object-oriented and procedural language code. The software may execute entirely on an end-user device, or partly on an end-user device and partly on a server.

The present invention provides improved techniques for handling time-sensitive messages and events. A sender of a message, event, or to-do item indicates the time sensitivity thereof. Preferably, time sensitivity is indicated in terms of calendar date and time; alternatively, time sensitivity may be indicated in terms of elapsed time (such as 30 hours from receipt of a to-do item, 15 minutes from receipt of an urgent message, etc.). In one aspect, the sender may be allowed to specify both a starting and an ending date and/or time for the time-sensitivity. In another aspect, the current time may be assumed to be the start of the time-sensitivity period. Use of the disclosed techniques thereby provides much more valuable information than is available in prior art systems which merely indicate urgent vs. normal, and also provides benefits over approaches such as that used in Eudora which supports a small number of different degrees in urgency settings. Furthermore, use of the disclosed techniques enables a sender to have much more influence over how a recipient handles an incoming message or event.

Preferably, features are added to an e-mail or calendaring system to allow a message or event sender to mark messages and events as time-sensitive. The e-mail or calendaring system may be a prior art system that is extended to include the features disclosed herein. Or, a specially-written system may be provided which incorporates these novel features. One way in which the marking may be provided is through a pull-down window on a GUI display. Alternative techniques include pop-up windows, function keys defined for this purpose, and so forth. In preferred embodiments, the message creator marks a message at the time the message is being created. Alternatively, if outbound messages are held in an outbound queue prior to transmission, the message creator may add time sensitivity to outbound messages after their creation. In addition to marking a message as time-sensitive, input is preferably accepted as to parameters for the time-sensitivity. In particular, a starting and an ending time and/or date (referred to herein equivalently as starting and ending times) for the time-sensitive status are preferably accepted. (Optionally, a default value may be defined for either or both of the starting and ending times, and the message creator may accept the default value or override it, as appropriate. As one example, the starting time might default to the current time, and a default for the ending time might be defined as 1 hour from the current time. Default values of this type are preferably configurable by each message creator.) It may be advantageous in some implementations to provide for accepting only an ending time and/or date for the time-sensitive status, in which case the current time is assumed to be the starting time. Other useful parameters include: a setting as to whether follow-up action is required, and optionally, a deadline when such action should be performed; whether explicit confirmation of receipt of the message should be sent to the sender; etc. Message confirmation is preferably provided in a similar manner as prior art return receipt notifications.

Upon receipt of an e-mail message that has been marked as time-sensitive (and upon nearing the time-sensitive period of an already-received message), software on the receiver's computing device preferably detects that occurrence and notifies the recipient. In preferred embodiments, this notification comprises bringing the recipient's e-mail window to the foreground, making the window active, automatically opening the e-mail message, and requiring the user to take action before performing any other e-mail tasks. If the e-mail system is not already running when the time-sensitive event is received, then it is preferably started automatically. Tools such as Notes Minder, which is a feature of Lotus Notes from Lotus Development Corporation, may be used to automatically start an e-mail system upon occurrence of an event. Requiring action before allowing the user to proceed to other tasks is facilitated by the modal dialog support of the underlying prior art operating system, such as that which is provided by the Windows® operating system from Microsoft Corporation. ("Windows" is a registered trademark of Microsoft Corporation.) If the message has not yet reached a time-sensitive starting time, then these actions may be delayed until such time is reached. Upon receipt of an incoming time-sensitive event on a calendaring system (and upon nearing the time-sensitive period of an already-calendared event), software on the receiver's computing device preferably brings the calendar application to the foreground and proceeds similarly. Alternatively, the recipient may be paged upon such an occurrence, a phone message may be generated to notify the recipient, or other analogous notification techniques may be performed automatically. Actions to be taken by the recipient in response to being notified of an incoming or imminent time-sensitive message or event, in addition to preventing use of other e-mail or calendar tasks, may include one or more of: acknowledging the receipt (using techniques such as the previously-discussed return receipt feature of the prior art, for example); creating a textual response message; updating status information (such as whether the message's to-do items have been completed); and so forth.

Optionally, a hierarchical approach may be used for the actions to be taken for time-sensitive messages and/or events. For example, if a time-sensitive e-mail message indicates that 1 hour remains before the end of the time-sensitivity period, the recipient's may be opened and the message displayed, as stated above, whereas if only 30 minutes remain, then a more immediate type of action may be taken, such as flashing the frame of the e-mail window and if only 15 minutes remain, an alarm feature of the recipient's computer might be activated to provide an audible sound. If a hierarchy of stored events about the e-mail recipient or calendar owner's current status is available, such as that disclosed in U.S. Pat. No. 6,988,128 (Ser. No. 09/670,844, filed Sep. 27, 2000), which is titled "Calendar Events and Calendar-Driven Application Technique" and which is discussed in more detail below, then the automated actions that may be taken include: obtaining a pager number where this individual can be reached and sending a page to that number; obtaining a telephone number of an alternate contact and generating an automated telephone call to that number; obtaining a cell phone number where this individual can be reached and generating an automated cell phone call to that number; determining an instant messaging identifier or "ID" where this individual may be receiving instant messages, and generating an automated notification message to that ID; and so forth. (Refer to this U.S. Patent for more information on how the hierarchy of stored events is processed to determine an individual's current means of being contacted.)

Figure 3:
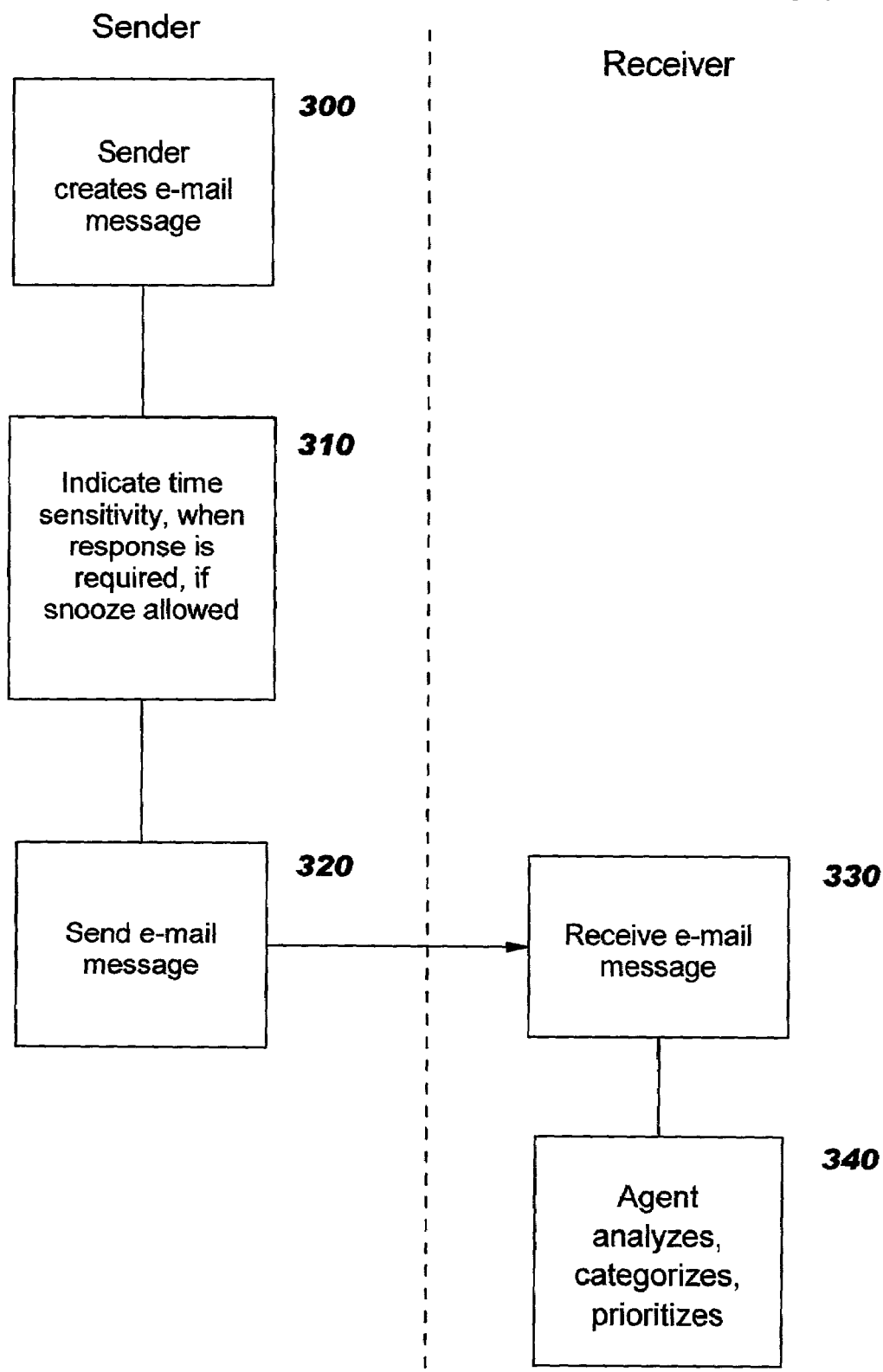
FIGS. 3 and 4 illustrate flowcharts which set forth logic which may be used to implement preferred embodiments of the present invention.
Figure 4:
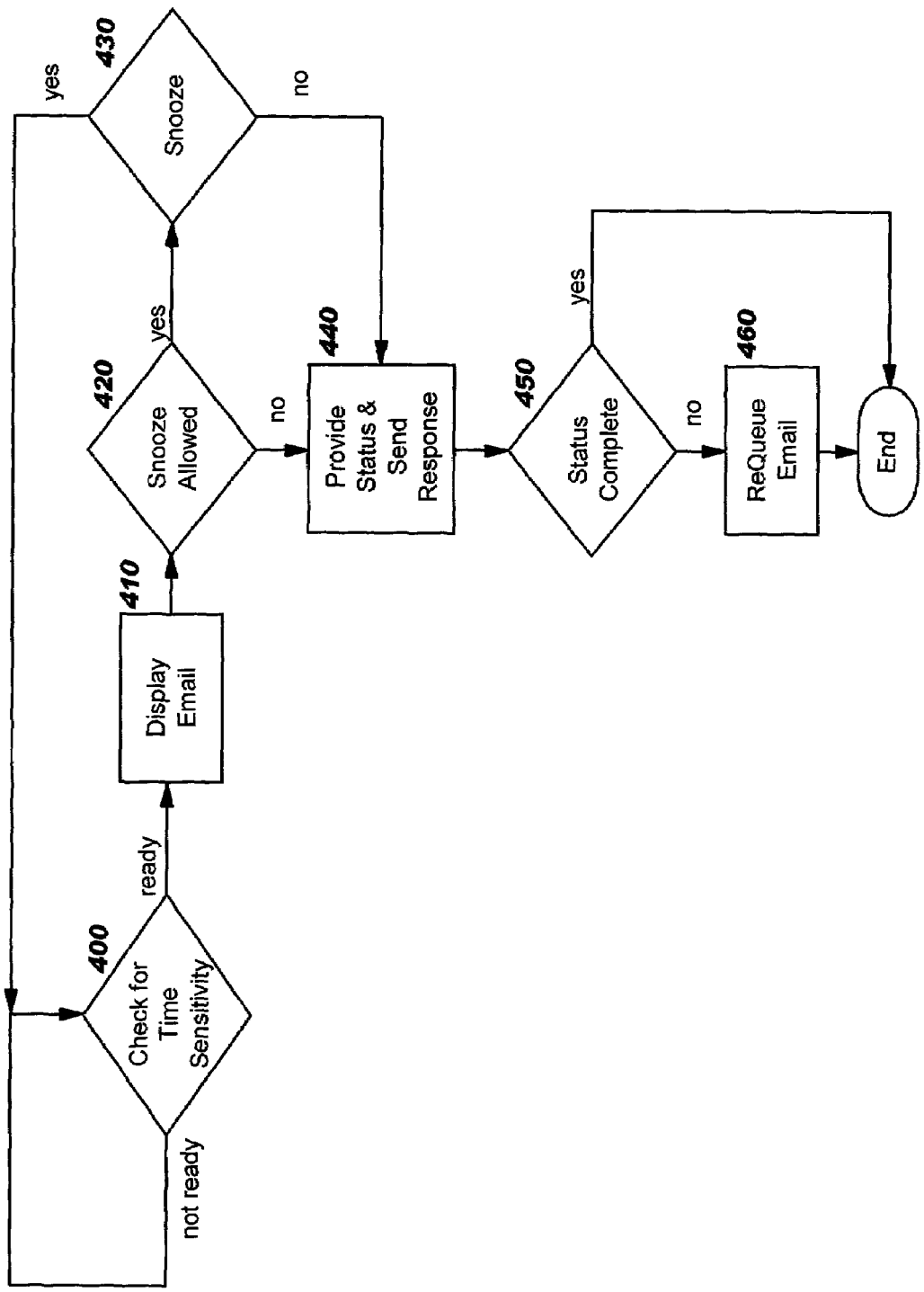

Logic which may be used to implement preferred embodiments of the present invention will now be described with reference to the flowcharts in FIGS. 3 and 4. FIG. 3 illustrates logic which pertains to message creation and delivery, and FIG. 4 illustrates logic which may be used to handle incoming (or previously-received) messages at a receiver.

The logic of FIG. 3 begins at Block 300 with the sender creating an e-mail message (or, equivalently, a calendar event or to-do item). A default time-sensitivity approach may be used, if desired, whereby messages will default to not being time-sensitive unless the message sender indicates otherwise. For example, an explicit action such as pressing a function key or button in an e-mail creation window may be required to mark a message as time-sensitive. As shown in Block 310, for those messages which are to be marked as time-sensitive, the sender preferably indicates information about the time sensitivity of the message, such as the time-sensitivity period; when a response is required, if any; and whether the recipient is allowed to use a "snooze" feature for this message. The snooze feature may be considered analogous to an alarm clock snooze feature, and enables the receiver to delay handling a message—but only temporarily. This snooze feature will be described in more detail with reference to FIG. 4. The message is then sent to the recipient (Block 320), and is received (Block 330) by the recipient's e-mail application. A software process or agent running on the recipient's computer then analyzes the message (Block 340). This analysis preferably comprises determining whether the message is time-sensitive, and if so, whether it is ready for processing, as described in more detail in FIG. 4. Other types of analysis may also be performed, such as comparing the message to predefined message filters according to the prior art. The agent also preferably categorizes the message according to whether it is time-sensitive or not and, if so, whether any follow-up has been requested by the sender. In preferred embodiments, the agent also performs prioritization of the messages in the recipient's mailbox, whereby information is remembered about the next upcoming time-sensitive message for this recipient: if this incoming message is earlier than the currently-remembered information, then it supersedes that remembered information. The process of FIG. 3 is repeated for each message. The logic depicted in FIG. 4 is invoked periodically, for example upon expiration of a sleep timer, and begins at Block 400 where the e-mail application (or, equivalently, the calendar application) running on a user's computer checks to see if there are any time-sensitive messages which are ready to be processed. This test preferably comprises checking the remembered information about time-sensitive events to see if the time-sensitivity period of the next such event has been reached. (Messages/events may be physically stored or logically organized using a queue, in which case the next time-sensitive message/event is preferably positioned at the head of the queue.) If not, then no further action is taken, and control returns to Block 400 where a delay is preferably enforced (e.g. via the sleep timer) until checking again to see if any time-sensitive events have become ready. Where there is a time-sensitive event ready for processing, control transfers to Block 410, where the message is displayed to the user (as described earlier) by automatically bringing the e-mail application to the foreground, making it active, and opening the message. Note that while preferred embodiments are described in terms of "displaying" a message to a recipient, this is for purposes of illustration and not of limitation. Other types of rendering may be used equivalently, such as speaking a notification to the recipient using a voice synthesizer, and so forth. (If a hierarchy of time-sensitivity actions is implemented, as discussed above, then additional or different actions may be taken depending on that hierarchy. While these additional or different actions have not been depicted in FIG. 4, it will be obvious to one of skill in the art how the logic of FIG. 4 may be altered for such actions.)

The test in Block 420 comprises checking to see if snoozing is allowed for this message. As stated with reference to Block 310 of FIG. 3, an initial setting for "snooze allowed" is preferably determined by the message sender, and allows the recipient to delay handling of the message until another time. This snooze feature may be useful, for example, if the receiver is in the midst of some task when the message notification occurs, and would prefer not to be interrupted just now to handle the message. When the test in Block 420 has a negative result (i.e. snoozing is not allowed for this message), control transfers to Block 440 where the message recipient is forced to respond to the displayed message. (As stated earlier, the modal dialog support of the operating system is preferably used to ensure that the user responds to the displayed message before being allowed to do other e-mail tasks.) Otherwise, when the test in Block 420 has a positive result, control transfers to Block 430 which checks to see if the receiver would like to use the snooze option. That is, a sleep or delay mechanism may be selectively invoked whereby no action is taken on this message until a snooze interval elapses. (The duration of the snooze interval is preferably configurable by the end user for his e-mail application. For example, the snooze interval may be set to 5 minutes.) If the snooze feature is selected in Block 430, then after delaying for the appropriate snooze interval, control return to Block 400 to process the message queue again. Otherwise, when the receiver chooses not to snooze and Block 430 therefore has a negative result, control transfers to Block 440 where the recipient responds to the message.

Optionally, the ending date and/or time of the time-sensitivity period may be checked after a positive result in Block 420, before transferring control to Block 430, such that a time-sensitive message which reaches the end of its time-sensitivity period is no longer allowed to snooze. In that case, control transfers directly to Block 440 from Block 420. Note that this technique of automatically disabling the snooze option at the end of the time-sensitivity period and requiring display of messages for which snoozing is not allowed force a recipient to respond to a message within the message-specific time-sensitivity period, avoiding the prior art problem where messages are often not even reviewed until the urgency of a message has passed.

Several different types of actions may be taken when responding to a message at Block 440, and preferably comprise providing the sender with an indication of the message status along with any response (such as a text message) created by the recipient. The message status preferably indicates whether the message has been completely handled by the recipient, and may also provide information such as: what date and time the recipient viewed the message; whether a required follow-up action has been taken; and so forth. (Note that status information about follow-up actions is preferably obtained by querying the user as to whether the action is complete. Alternatively, automated techniques may be appropriate for making this determination in some cases. Such automated techniques do not form part of the present invention.)

If the message status indicates that the processing of this message is not complete (a negative result in Block 450), then the message is preferably requeued (Block 460) at the appropriate location in the recipient's incoming mail. (Note that this requeuing is a preferably logical operation, rather than a physical movement of the message. For example, the time-sensitivity of the message is preferably compared to the currently-remembered next time-sensitive event, as described earlier, and may supersede that event if the message being analyzed requires handling sooner. Furthermore, the term "requeuing" is not meant to require that a queuing structure be used for storing messages.) Following completion of Block 460, and when Block 450 has a positive result (i.e. the message status indicates that the message handling is complete), iteration through the logic of FIG. 4 is complete for the current message. In this manner, the present invention automatically "remembers" those messages which need further action, relieving the recipient of the burden of manually moving messages to various folders as a reminder that more action is needed (or having to remember this information on his own). When the logic of FIG. 4 is repeated, the uncompleted message win be analyzed again and re-displayed to the recipient. (The sender may also avoid having to manually move messages to a Follow Up folder for message tracking purposes when this technique is used.)

Prior art mail systems such as Lotus Notes are adapted to creating multiple views over the messages in a mailbox, where each different view may be specified in a formulaic manner. For example, providing an "Urgent" view comprises testing a Boolean flag which indicates whether a particular message has been flagged as urgent. Those messages with the flag set to TRUE are selected for inclusion in the view, while other messages are not. In the prior art, views may be created for different time/date ranges of message creation (or perhaps message receipt) in a similar manner. This views approach may optionally be used with the present invention to analyze the time-sensitivity date/time information of received messages. By remembering the next upcoming time-sensitive event, a view can be created of those messages having an earlier time-sensitivity. If there are no messages in the resulting view, then the messages are in proper prioritized order; if not, then reordering is required. Similarly, the test in Block 400 may be performed by creating a view of those time-sensitive messages having a starting time-sensitivity period which is earlier than the current time, and checking the number of messages in the view. If this view is empty, then there are no messages ready for processing. Processing views in this manner may increase the overall efficiency of processing of messages which are marked time-sensitive, as each message in the recipient's entire incoming mailbox may not necessarily need to be evaluated.

As has been demonstrated, the present invention discloses advantageous techniques which provide a new paradigm for e-mail and calendaring, whereby message and event creators have more control over how receivers handle those messages and events. While prior art systems may force senders to send multiple follow-up messages, attempting to determine the status of a previously-sent message, the disclosed techniques automate the sending of status information (and effectively force the recipient to provide this updated status). The disclosed techniques help to ensure that messages will be viewed in a timely manner, according to the sender's representation of the time-sensitivity of the message. Prioritization of incoming messages moves from being under complete control of recipients, as is the situation in the prior art, to giving senders some control as well. As a result of these improvements, communication between senders and receivers may become more effective. Furthermore, it will be obvious how the disclosed techniques may be adapted to other types of messaging systems, including voice mail, instant messaging, etc.

Commonly-assigned U.S. Pat. No. 6,988,128 (Ser. No. 09/670,844, filed Sep. 27, 2000), which is titled "Calendar Events and Calendar-Driven Application Technique", discloses techniques whereby information about an electronic calendar user can be made automatically available to others. This information includes whether the calendar user checks bis e-mail, and how often he checks it, for various types of status events pertaining to the calendar. For example, if the calendar user's current status (as determined from his calendar) shows that he is away from the office, the information provided according to this invention may indicate whether he checks e-mail while be is away from the office. Commonly-assigned U.S. Pat. No. 6,640,230 (Ser. No. 09/671,001, filed Sep. 27, 2000), which is titled "Calendar-Driven Application Technique for Preparing Responses to Incoming Events" is related, and discloses techniques whereby status information can be determained from the user's calendar in advance of receiving incoming events (such as incoming e-mail, voice calls, instant messages, etc.), and used to prepare customized responses which supply information pertaining to the user. The information from this analysis is stored and can then he used to quickly generate a response when a message does arrive. While these inventions enable a message sender to obtain some information, this information is directed toward whether the user is likely to be using e-mail; the sender still has no more control over the recipient's handling of incoming e-mail messages than in other prior art e-mail systems which have already been discussed. These inventions therefore do not teach the inventive concepts disclosed herein.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed:

1. A method of handling time-sensitive messages, comprising steps of:
   marking a message, by a creator thereof, as time-sensitive;
   sending the marked message from a computing device of the creator to a computing device of a recipient for whom the message was created, such that after the marked message is received at the computing device of the recipient, it will be processed by:
   determining that the marked message is marked as being time-sensitive and that a time period of the time-sensitivity has been reached but not exceeded;
   determining whether a hierarchy of recipient notification techniques has been defined for various intervals of the time-sensitivity, and if so, performing steps of:
   determining an applicable one of the various intervals that corresponds to a current time;
   selecting one of the recipient notification techniques which corresponds to the determined one of the various intervals; and
   notifying the recipient of the marked message using the selected recipient notification technique; and
   automatically rendering the marked message to the recipient using an application adapted for processing the message within a time period of the time-sensitivity, further comprising steps of:
   automatically starting execution of the application, at the computing device of the recipient, if the execution of the application is not currently started;
   automatically bringing a window rendered by the application to a foreground of a display of the computing device and making the window active;
   automatically rendering the marked message in the active window; and
   requiring the recipient to take action with the marked message before performing any other tasks with the application by preventing the recipient from performing other actions with the application until the recipient provides a response to the marked message; and
   automatically receiving a reply from the recipient, sent from the computing device of the recipient to the computing device of the creator following the recipient's response thereto.

2. The method according to claim 1, wherein the marking step further comprises indicating, by the creator, that snoozing is allowed by the recipient for this message, such that the recipient will be allowed to temporarily delay the response to the rendered message for a time that remains within the time period of the time-sensitivity.

3. The method according to claim 1, wherein the marking step further comprises indicating, by the creator, an ending time for the time period of the time-sensitivity of the message.

4. The method according to claim 3, wherein the marking step further comprises indicating, by the creator, a starting time for the time period of the time-sensitivity of the message.

5. A method of improving electronic communications, comprising steps of:
   receiving a plurality of electronic messages at a computing device of a recipient to whom the electronic messages are addressed;
   determining whether a selected one of the received electronic messages is marked as being time-sensitive; and
   if the determining step has a positive result and a time period of the time-sensitivity has been reached but not exceeded, processing the selected one of the received electronic messages, further composing steps of:
   determining whether a hierarchy of recipient notification techniques has been defined for various intervals of the time-sensitivity, and if so, performing steps of:
   determining an applicable one of the various intervals that corresponds to a current time;
   selecting one of the recipient notification techniques which corresponds to the determined one of the various intervals; and
   notifying the recipient of the selected one of the received electronic messages using the selected recipient notification technique; and
   automatically rendering the selected one of the received electronic messages to the recipient in an application adapted for processing the selected one of the received electronic messages within the time period of the time-sensitivity, further comprising steps of:
- automatically starting execution of the application, at the computing device of the recipient, if the execution of the application is not currently started;
- automatically bringing a window rendered by the application to a foreground of a display of the computing device and making the window active;
- automatically rendering the selected one of the received electronic messages in the active window; and
- requiring the recipient to take action with the selected one of the received electronic messages before performing any other tasks with the application by preventing the recipient from performing other actions with the application until the recipient provides a response to the selected one of the received electronic messages within the time period of the time-sensitivity.

6. The method according to claim 5, wherein the processing step further comprises the steps of:
- determining whether snoozing is allowed for the selected one of the received electronic messages; and
- if so, allowing the recipient to delay the response to the selected one of the received electronic messages until a later time, wherein the later time remains within the time period of the time-sensitivity.

7. The method according to claim 5, wherein the processing step further comprises the steps of:
- determining whether snoozing is allowed for the selected one of the received electronic messages; and
- if so, suppressing the preventing step only while (1) a starting time of the time period has been reached and (2) an ending time of the time period has not been reached.

8. The method according to claim 5, further comprising the step of:
- sending a notification of the response to a computing device of a creator of the rendered selected one.

9. The method according to claim 5, further comprising the step of determining whether processing of the rendered selected one is complete, and if not, remembering the rendered selected one for subsequent evaluation at a later time, wherein the later time is within the time period of the time-sensitivity.

10. The method according to claim 5, wherein the electronic messages are e-mail messages.

11. The method according to claim 5, wherein the electronic messages are electronic calendar events.

12. The method according to claim 5, wherein the electronic messages are to-do items.

13. A system for handling time-sensitive messages, comprising:
- means for marking a message, by a creator thereof, as time-sensitive;
- means for sending the marked message from a computing device of the creator to a computing device of a recipient for whom the message was created, such that after the marked message is received at the computing device of the recipient, it will be processed by:
  - determining that the marked message is marked as being time-sensitive and that a time period of the time-sensitivity has been reached but not exceeded;
  - determining whether a hierarchy of recipient notification techniques has been defined for various intervals of the time-sensitivity, and if so, performing steps of:
    - determining an applicable one of the various intervals that corresponds to a current time;
    - selecting one of the recipient notification techniques which corresponds to the determined one of the various intervals; and
    - notifying the recipient of the marked message using the selected recipient notification technique; and
    N
  - automatically rendering the marked message to the recipient using an application adapted for processing the message within a time period of the time-sensitivity, further comprising:
    - automatically starting execution of the application, at the computing device of the recipient, if the execution of the application is not currently started;
    - automatically bringing a window rendered by the application to a foreground of a display of the computing device and making the window active;
    - automatically rendering the marked message in the active window; and
    - requiring the recipient to take action with the marked message before performing any other tasks with the application by preventing the recipient from performing other actions with the application until the recipient provides a response to the marked message; and
- means for automatically receiving a reply from the recipient, sent from the computing device of the recipient to the computing device of the creator following the recipient's response.

14. The system according to claim 13, wherein the marking means further comprises means for indicating, by the creator, an ending time for the time period of the time-sensitivity of the message.

15. A system for improving electronic communications, comprising:
- means for receiving a plurality of electronic messages at a computing device of a recipient to whom the electronic messages are addressed;
- means for determining, at the computing device, whether a selected one of the received electronic messages is marked as being time-sensitive; and
- means for processing the selected one if the means for determining has a positive result and a time period of the time-sensitivity has been reached but not exceeded, further comprising:
  - means for determining whether a hierarchy of recipient notification techniques has been defined for various intervals of the time-sensitivity, and if so, means for using the hierarchy by:
    - determining an applicable one of the various intervals that corresponds to a current time;
    - selecting one of the recipient notification techniques which corresponds to the determined one of the various intervals; and
    - notifying the recipient of the selected one of the received electronic messages using the selected recipient notification technique; and
  - means for automatically rendering the selected one of the received electronic messages to the recipient in an application adapted for processing the selected one of the received electronic messages within the time period of the time-sensitivity by:

automatically starting execution of the application, at the computing device of the recipient, if the execution of the application is not currently started;

automatically bringing a window rendered by the application to a foreground of a display of the computing device and making the window active;

automatically rendering the selected one of the received electronic messages in the active window; and requiring the recipient to take action with the selected one of the received electronic messages before performing any other tasks with the application by preventing the recipient from performing other actions with the application until the recipient provides a response to the selected one of the received electronic messages within the time period of the time-sensitivity.

16. A computer program product for handling time-sensitive messages, the computer program product embodied on one or more computer-readable media and comprising:

computer-readable program code for marking a message, by a creator thereof, as time-sensitive;

computer-readable program code for sending the marked message from a computing device of the creator to a computing device of a recipient for whom the message was created, such that after the marked message is received at the computing device of the recipient, it will be processed by:

determining that the marked message is marked as being time-sensitive and that a time period of the time-sensitivity has been reached but not exceeded;

determining whether a hierarchy of recipient notification techniques has been defined for various intervals of the time-sensitivity, and if so, performing steps of:

determining an applicable one of the various intervals that corresponds to a current time;

selecting one of the recipient notification techniques which corresponds to the determined one of the various intervals; and notifying the recipient of the marked message using the selected recipient notification technique; and automatically rendering the marked message to the recipient using an application adapted for processing the message within a time period of the time-sensitivity, further comprising:

automatically starting execution of the application, at the computing device of the recipient, if the execution of the application is not currently started;

automatically bringing a window rendered by the application to a foreground of a display of the computing device and making the window active;

automatically rendering the marked message in the active window; and requiring the recipient to take action with the marked message before performing any other tasks with the application by preventing the recipient from performing other actions with the application until the recipient provides a response to the marked message; and computer-readable program code for automatically receiving a reply from the recipient, sent from the computing device of the recipient to the computing device of the creator following the recipient's response thereto.

17. The computer program product according to claim 16, wherein the computer-readable program code for marking further comprises computer-readable program code for indicating, by the creator, an ending time for the time period of the time-sensitivity of the message.

18. A computer program product for improving electronic communications, the computer program product embodied on one or more computer-readable media and comprising:

computer-readable program code for receiving a plurality of electronic messages at a computing device of a recipient to whom the electronic messages are addressed;

computer-readable program code for determining, at the computing device, whether a selected one of the received electronic messages is marked as being time-sensitive, and if so, whether a time period of the time-sensitivity has been reached but not exceeded; and computer-readable program code for processing the selected one when the computer-readable program code has a positive result, further comprising computer-readable program code for:

determining whether a hierarchy of recipient notification techniques has been defined for various intervals of the time-sensitivity, and if so, performing steps of:

determining an applicable one of the various intervals that corresponds to a current time;

selecting one of the recipient notification techniques which corresponds to the determined one of the various intervals; and notifying the recipient of the selected one of the received electronic messages using the selected recipient notification technique; and automatically rendering the selected one of the received electronic messages to the recipient in an application adapted for processing the selected one within the time period of the time-sensitivity, further comprising:

automatically starting execution of the application, at the computing device of the recipient, if the execution of the application is not currently started;

automatically bringing a window rendered by the application to a foreground of a display of the computing device and making the window active;

automatically rendering the selected one of the received electronic messages m the active window; and requiring the recipient to take action with the selected one of the received electronic messages before performing any other tasks with the application by preventing the recipient from performing other actions with the application until the recipient provides a response to the selected one of the received electronic messages within the time period of the time-sensitivity.

* * * * *